INVENTOR.
GRANT W. CHENEY

INVENTOR.
GRANT W. CHENEY

United States Patent Office 3,441,983
Patented May 6, 1969

3,441,983
APPARATUS FOR FORMATION OF THERMOPLASTIC SHEET INTO A CUP-LIKE CONTAINER
Grant W. Cheney, Midland, Mich., assignor to The Dow Chemical Company, Midland, Mich., a corporation of Delaware
Filed Sept. 9, 1963, Ser. No. 307,558
Int. Cl. B29c 17/04
U.S. Cl. 18—19   3 Claims This invention relates to an apparatus for the formation of thermoplastic sheet into containers, and more particularly, cup-like containers.

It is, of course, known to form a cup-like container from a heated thermoplastic sheet material by mechanically forcing the material into a die cavity by use of a mandrel, following which the material is expanded by pressure fluid into contact with the walls of the cavity. The cup-like container so formed is trimmed about its lip portion either prior to or after removal from the die cavity.

While some of such known methods and apparatus have produced satisfactory containers, most require a high degree of adjustment, and production under carefully controlled conditions. One problem encountered is the obtainment of uniform wall thickness in the container. An underlying cause which contributes to such problem is the fact that once any portion of the material engages the mandrel and/or the walls of the die cavity, it has a tendency to stick thereto which action prevents further stretching of the material so engaged. Consequently, the material which is last engaged by the mandrel, or die cavity, is stretched more than the material which has prior engagement therewith. As a result, a cup of non-uniform wall thickness is produced which lacks high strength qualities, and is often of unattractive appearance.

The apparatus of the invention will be found to produce thermoplastic cups of uniform wall thickness and of attractive appearance. Briefly, the inventive concept is founded upon a controlled stretching of the thermoplastic material prior to being forced into contact with the cup shaping recess of the molding cavity. Such stretching is accomplished by forcing a sheet of heated thermoplastic material into engagement with a symmetrically contoured surface to form areas of dissimilarly stretched material. The preliminarily stretched material is then forced into engagement with the walls of a forming recess provided in a molding cavity, whereby subsequent stretching results in a finished container having walls of uniform thickness. The prestretching and final stretching is accomplished by application of pressure differentials to the material. Prior to material stretching, a disc is cut from the material, said disc forming the body of material from which the container is eventually fabricated. The entire operation is adaptable for the production of high quality containers in high quantity lots. A second embodiment of the invention will be found to be especially useful for handling pre-oriented film material without destroying any of its beneficial oriented qualities.

The main object of this invention is to provide improved apparatus for the production of containers made from thermoplastic sheet material.

A specific object of this invention is to provide an apparatus which will produce thermoplastic cup-like containers of improved strength and attractive appearance.

A more specific object is to provide an apparatus for production of uniform thickness thermoplastic cup-like containers.

Another object is to provide an apparatus adaptable for the production of high quality and high quantity thermoplastic sheet containers.

Still another object is to provide apparatus for forming deep drawn receptacles from pre-oriented sheet material without destroying the orientation of the material.

These and further objects and features will become more apparent from the following description and accompanying drawings wherein.

Figure 1:
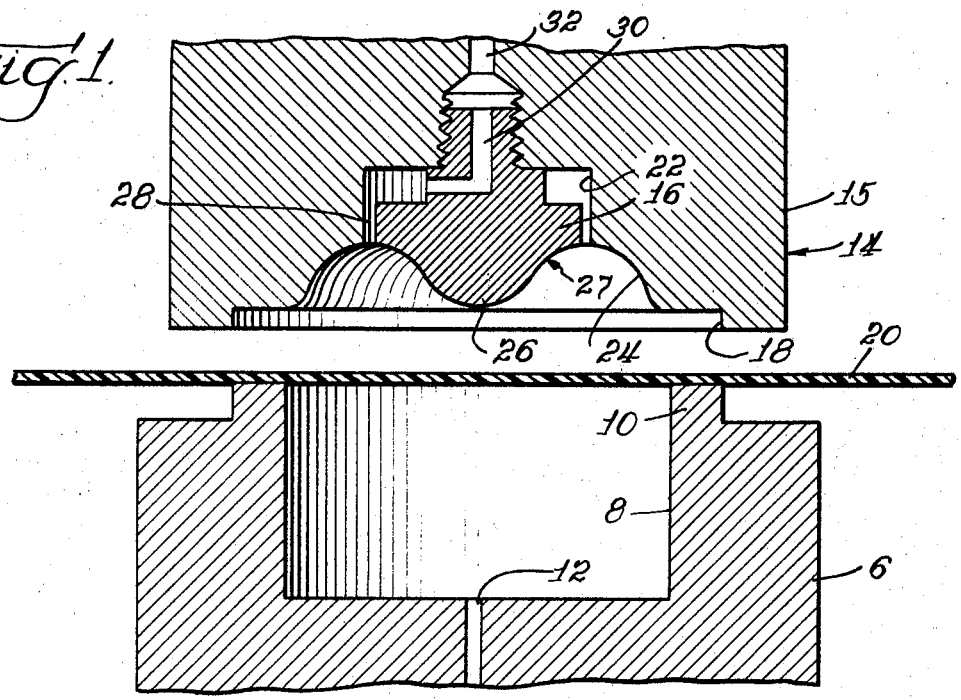
FIG. 1 is a vertical section view of apparatus illustrative of first embodiment of the invention, and showing an initial phase of operation.

Referring now to the drawings, numeral 6 identifies a mold cavity having a forming recess 8, and a peripheral projection 10, which serves as a material severing means. A passageway 12 is formed at the lower region of the forming recess 8, which passageway may be selectively connected to a source of subatmospheric pressure (vacuum) or superatmospheric pressure (compressed air) neither one of which is shown.

Figure 2:
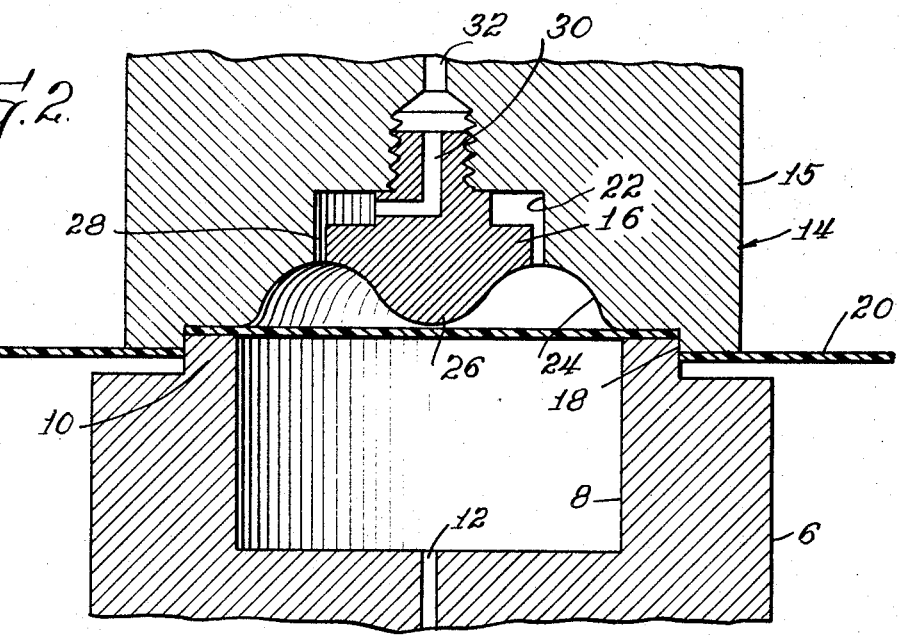
FIG. 2 is the same, but showing a sheet of thermoplastic material after edge severing and prior to a stretching operation.

A mold top assembly 14, positioned above the mold cavity, includes a mold 15, and a centerpiece 16 threadably secured thereto. The mold cavity is formed with a disc-like recess 18, the diameter of which provides a sliding fit with the projection 10 of the mold cavity whereby a sheet of thermoplastic material 20 will be severed to form a disc, as seen in FIG. 2. A second recess 22 is arranged in the mold, which second recess is concentric with a recess 18, and is spaced therefrom by a curved recess 24. The latter is formed to cooperate with an axially disposed, rounded projection 26 of the centerpece 16, to provide a symmetrically undulated or contoured shape 27 which will provide controlled prestretch of the thermoplastic material 20, as will be described in greater detail hereinafter. Means (not shown) are provided for moving the mold top assembly 14, toward or away from the mold cavity 6, as required in a cup formation operation.

The vertical peripheral surface of the centerpiece 16 is in spaced relation to the wall of the recess 22 to provide an annular passageway 28, the lower end of which coincides with the high point of the contoured shape. A passageway 30, formed in the centerpiece 16, connects the passageway 28 with a passageway 32 in the mold 15. The passageway 32 is connected to a source of subatmospheric pressure (vacuum), or superatmospheric pressure (compressed air), neither one of which is shown.

Operation of the apparatus above described is as follows: The sheet material 20 is heated to a moldable condition and placed in contact with the top surface of the peripheral projection 10. The mold top assembly 14 is then moved downwardly, resulting in the severing of the material by the side wall of the recess 18 to form a disc which is maintained in clamped position between the top surface of the mold projection 10 and a horizontal surface of the recess 18, as seen in FIG. 2.

Figure 3:
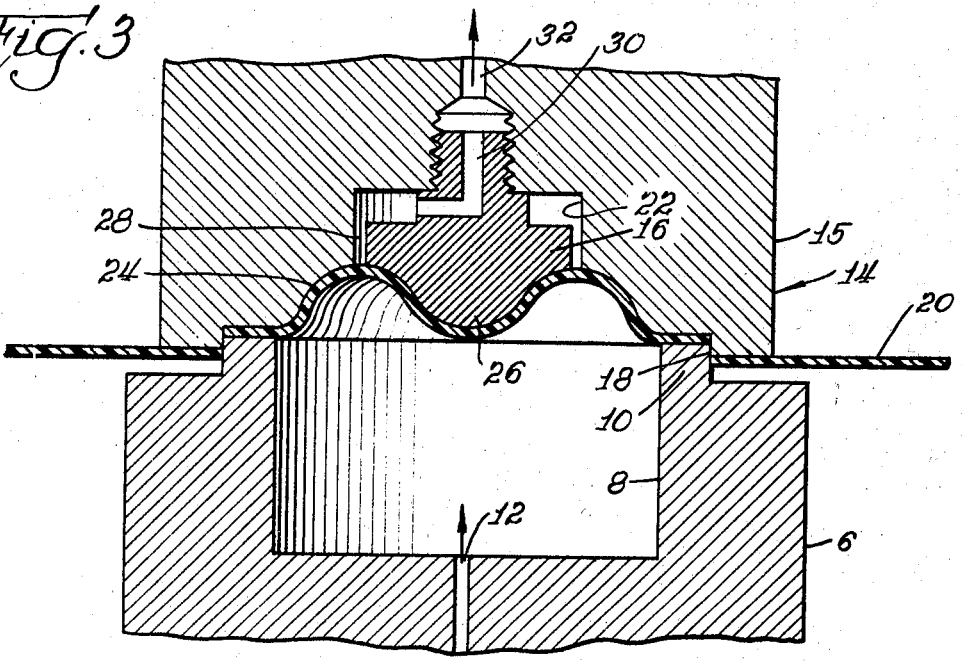
FIG. 3 is the same, but showing the position of the sheet material after a preliminary stretching operation.

A pressure differential is then developed on the severed sheet by exposing the region above the sheet to a subatmospheric pressure, i.e., vacuum via annular passageway 28, and passageways 30 and 32, and the region below the severed sheet to a superatmospheric pressure, i.e., compressed air, for example. As a result, the main porion of the severed sheet, i.e., that not being clamped, will be forced upward into contact with the contoured shape 27, as seen in FIG. 3. It will be noted that in such condition, the sheet will be stretched least in the center as well as the peripheral regions, and stretched more in the midregion, that is, at that part of the curved shape 27 in the region of the annular passageway 28.

Figure 4:
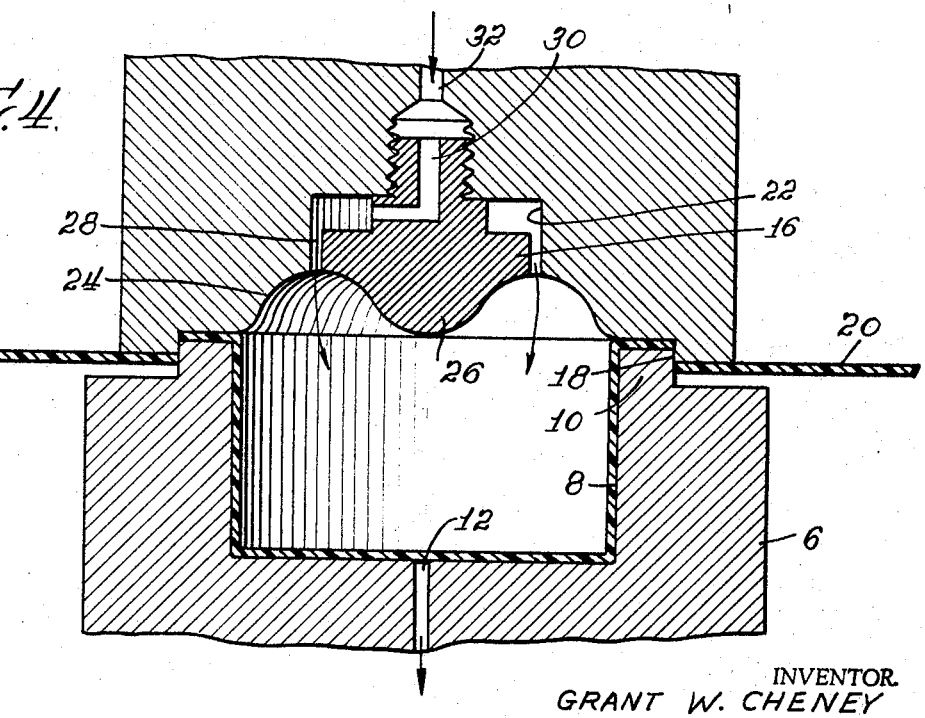
FIG. 4 is the same, but showing the sheet material after it has been fully formed into a cup-like container.

The pressure differential is next reversed on the sheet material by exposing the region above the sheet to a superatmospheric pressure, and the region below the sheet material to a subatmospheric pressure. As a result, the material is forced into full engagement with the forming recess 8, as seen in FIG. 4. During such movement of the material into final molded condition, the material in the previously least stretched areas will have a tendency to stretch more than the material in the previously stretched areas, so that a container of substantially uniform wall thickness will be formed.

The formed cup will quickly set up because of heat transfer between the cup and the walls of the forming recess 8. The formed cup may be removed from the forming recess by admitting compressed air, via passageway 12, to the forming recess, or by use of ejector pins (not shown). The molding operation may be coupled with a sheet material extruding operation whereby the material is taken directly from an extruder, while still warm and moldable, and passed to the molding apparatus.

Figure 5:
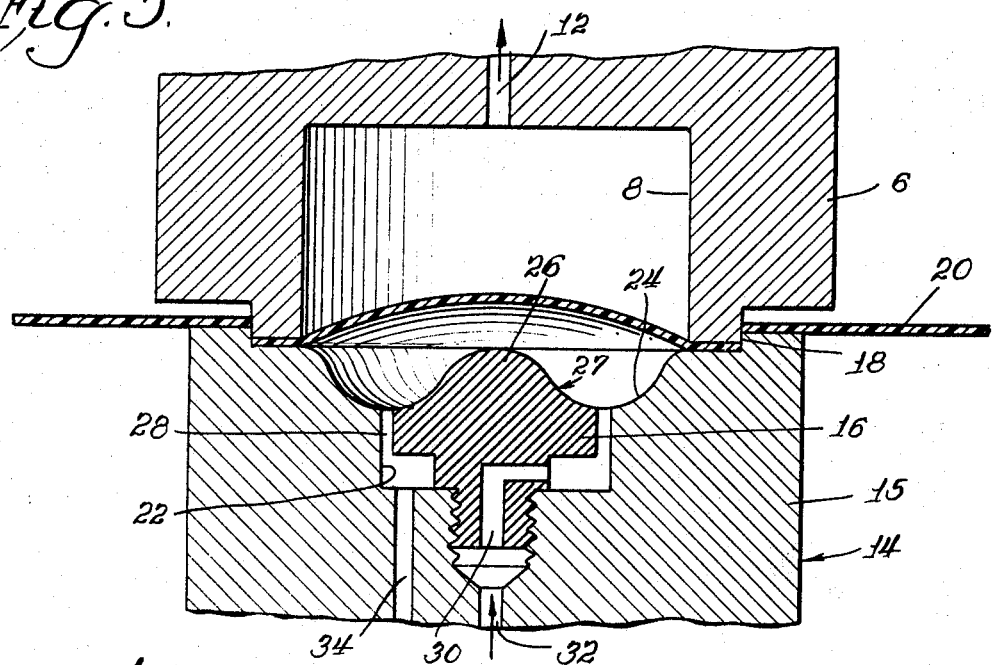
FIG. 5 is a vertical section view of apparatus illustrative of a second embodiment of the invention, and showing an initial phase of operation.
Figure 6:
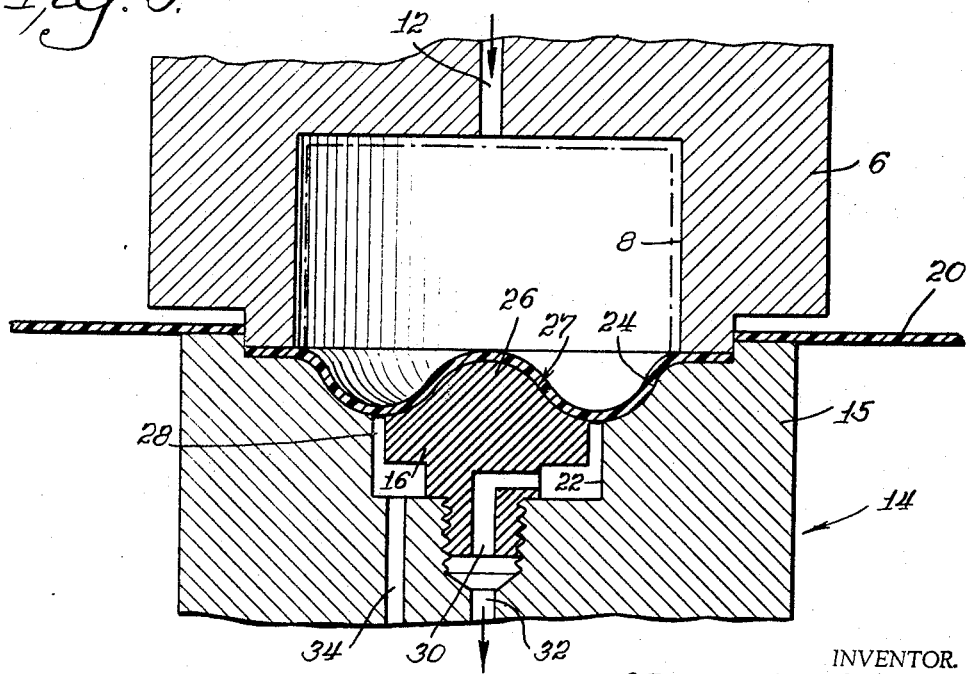
FIG. 6 is the same but showing an intermediate phase of operation.

A second embodiment of the invention is illustrated in FIGS. 5 and 6, which second embodiment is structurally similar to the first embodiment; however, it provides a slightly different type of operation. To avoid repetition, parts in common between the two embodiments will be identified by the same numerals, and the description of the second embodiment will only be concerned with the difference in structure over the first embodiment.

It will be apparent that the structure of the second embodiment is generally like that of the first embodiment, except for the fact that the parts of the second embodiment are relatively upside down as compared to the equivalent parts of the first embodiment. In addition, to such a reversal of parts, the mold 15 is provided with a passageway 34 which connects the second recess 22 with a source (not shown) of heated medium, such as steam.

The operation of the second embodiment is as follows: Assume that a sheet of thermoplastic material 20, in unheated condition, is clamped between the molds 6 and 15, and is trimmed as shown in FIG. 5. Low pressure steam is then admitted to the underside of the film to heat the same to render it more pliable. The steam is then shut off, and the heated sheet is subjected to a pressure differential by admitting compressed air to the recess 8, and drawing a vacuum on the lower sides of the sheet, via passageway 30. As a result, the sheet material will be forced into contact with the contoured shape 27 of the mold 15 (FIG. 6), which will result in the desired stretching of the material. The pressure differential is then reversed by admitting compressed air to the underside of the sheet via the passageway 30, while the upper side of the sheet is exposed to a vacuum via passageway 12. The sheet material will then be forced into snug engagement with the walls of the recess 8 to form a finished cup of similar configuration to the cup shown in FIG. 4 of the first embodiment. Any condensate from the steam, used in heating the material, may pass from the recess 22, via the passageway 34.

The second embodiment of the invention will be found especially useful for handling preoriented sheet material. By controlling the heating rate and maximum temperature, such preoriented material may be drawn into final cup shape without destroying the orientation, thus producing a finished cup of high strength.

It will thus be seen that the apparatus of both embodiments of the invention will provide a simple and effective operation for forming cups of thermoplastic sheet material, which cups will have walls of uniform thickness, and attractive appearance. In essence, the apparatus will satisfy all of the objectives of the invention as set forth hereinbefore.

What is claimed is:

1. Apparatus for forming moldable thermoplastic sheet material into a container comprising, a mold cavity having a container forming recess, and a peripheral projection which serves as a material severing means, and a mold top assembly having a recess with a symmetrically formed undulated curved surface which will provide controlled prestretch of the sheet material at desired areas thereon, said mold top assembly being movable toward the mold cavity and being formed with a disc-like recess which is arranged for a sliding fit with said peripheral projection, said symmetrically formed undulated surface having an axially disposed rounded projection extending in the direction of said disc-like recess, and said mold top assembly being formed to provide a passageway selectively connectible with either a source of subatmospheric pressure or a source of superatmospheric pressure, said mold cavity being formed to provide a passageway selectively connectible with either a source of superatmospheric pressure or a source of subatmospheric pressure.

2. Apparatus according to claim 1, wherein said rounded projection is formed on a centerpiece which is threadably secured in the mold top assembly.

3. Apparatus according to claim 2, wherein said undulated surface is formed by said axially disposed rounded projection and a curved portion extending from the disc-like recess to an annular passageway, said annular passageway being defined in part by said centerpiece and a second recess formed in the mold top assembly.

References Cited

UNITED STATES PATENTS

| | | | |
|---|---|---|---|
| 912,092 | 2/1909 | Droitcour | 264—88 |
| 1,221,846 | 4/1917 | Dreux | 264—292 |
| 2,749,572 | 6/1956 | Nowak | 264—92 |
| 2,926,385 | 3/1960 | Willson | 264—89 |
| 2,990,581 | 7/1961 | Rowe | 264—89 |
| 3,167,104 | 1/1965 | Wiley et al. | |
| 3,244,780 | 4/1966 | Levey et al. | 264—89 |

FOREIGN PATENTS

| | | |
|---|---|---|
| 334,742 | 1/1959 | Switzerland. |
| 741,040 | 11/1955 | Great Britain. |
| 1,238,420 | 6/1960 | France. |

ROBERT F. WHITE, *Primary Examiner.*

T. J. CARVIS, *Assistant Examiner.*

U.S. Cl. X.R.

264—89